United States Patent Office 3,716,626
Patented Feb. 13, 1973

3,716,626
SEPARATION OF METAL CARBONYL CATALYSTS FROM OXO REACTION MIXTURES
Wilhelm Kniese, Limburgerhof, Hans Juergen Nienburg, Ludwigshafen, Walter Himmele, Walldorf, and Werner Aquila, Ludwigshafen, Germany, assignors to Badische Anilin- & Soda-Fabrik Aktiengesellschaft, Ludwigshafen (Rhine), Germany
No Drawing. Filed Oct. 15, 1970, Ser. No. 81,169
Claims priority, application Germany, Oct. 29, 1969,
P 19 54 315.8
Int. Cl. C01g 51/02, 55/00; B01d 15/04
U.S. Cl. 423—418                                    6 Claims

ABSTRACT OF THE DISCLOSURE

An improved process for the separation of metal carbonyl catalysts capable of forming carbonylate anions from oxo reaction mixtures by means of ion exchangers by treating the crude oxo reaction mixture with a basic ion exchanger at a temperature of 0° to 120° C. and pressures ranging from 5 to 700 atmospheres.

---

The invention relates to an improved process for the separation of metal carbonyl catalysts from oxo reaction mixtures by treatment with ion exchangers.

The reaction mixtures obtained from the oxo reaction contain the metal carbonyl complexes used as catalysts in the dissolved state. Since the valuable metals must be recovered and the metal carbonyl compounds contained in the reaction mixture have a detrimental effect on the further treatment of the mixture, these metals must be removed. A number of methods are known for the removal of such metal carbonyl catalysts from oxo reaction mixtures. It is known, for example, to decompose the metal carbonyl catalysts by the action of heat, for example by treating with steam, and thus to recover the metals as such. The recovery of the metals, however, is difficult, since they separate out in a finely divided form which is difficult to isolate. The finely divided metals also tend to form metallic "silvering" on the surface of the equipment used. In another method the metal carbonyl catalysts contained in the oxo reaction mixture are decomposed by an oxidizing treatment, for example using air, and the resulting aquous solution of metal salts is separted from the oxo reaction mixture. This process suffers from the drawback that the oxidizing also attacks the sensitive aldehydes present in the mixture and, furthermore, it does not ensure that the total amount of metal is removed. For this reason it has been proposed to treat the oxo reaction mixture with ion exchanges after it has been subjected to the oxidizing treatment, in order to separate the metal cations. This process has the disadvantage, however, that it is still necessary to carry out an oxidizing treatment of the oxo reaction mixture containing the metal carbonyl catalysts.

It is an object of the invention to provide a process in which metals are removed from oxo reaction mixtures up to the limit of analytical detectability.

It is another object of the invention to provide a process in which catalyst metals may be removed from oxo reaction mixtures without the formation of metallic "silvering."

Yet another object of the invention is to provide a process in which oxo reaction mixtures from which metals are to be removed need not be subjected to a prior detrimental treatment with oxidizing agents.

In accordance with the present invention these and other objects and advantages are achieved in an improved process for the separtion of metal carbonyl catalysts capable of forming carbonylate anions from oxo reaction mixtures using ion exchangers in which the crude oxo reaction mixture is treated with a basic ion exchanger at a temperature of from 0° to 120° C. and a pressure of from 5 to 700 atmospheres.

The preferred oxo reaction mixtures which are used are produced by the reaction of aliphatic cycloaliphatic or aralipatic, cycloaliphatic or araliphatic olefinically unsaturated compounds of up to 20 carbon atoms and optionally containing a plurality of double bonds, for example two non-conjugated double bonds, or substituents which are inert under the conditions of the reaction, such as alkoxy groups of from 1 to 4 carbon atoms or acyloxy groups, in particularly olefins of from 2 to 20 carbon atoms, with a mixture of carbon monoxide and hydrogen at temperature ranging from 80° to 220° C. and pressures ranging from 5 to 700 atmospheres, in the presence of metal carbonyl catalysts capable of forming carbonylate anions, preferably those contained in Group VIII of the Periodic Table. The oxo reaction mixtures mainly contain aldehydes and/or alcohols according to the starting materials used. The concentration of the metal carbonyl catalysts is generally from 10 p.p.m. to 1% by weight based on the crude oxo reaction mixture and calculated as metal.

The crude oxo reaction mixture is treated with the basic ion exchangers at a temperatures ranging from 0° to 120° C., especially from 20° to 60° C., and in the presence of carbon monoxide and hydrogen at pressures ranging from 5 to 700 atmospheres, especially at pressures ranging from 20 to 300 atmospheres. The pressure and temperature are selected that the metal carbonyl catalysts are present in the oxo reaction mixture in the form of metal carbonyl hydrides, that is, at lower pressures the temperature must also be lowered accordingly.

The present process has been found to be particularly useful for the removal of cobalt and rhodium carbonyl catalysts, particularly rhodium carbonyl catalysts.

Preferred ion exchanger resins are those containing primary, secondary, tertiary and quaternary amino groups. Of particular interest are ion exchanger resins based on polystyrene and containing tertiary amino groups or quaternary amino groups in the basic form. Particularly suitable are weakly to strongly basic ion exchangers, for example, "Amberlite" IR 45 and "Dowex" 4. Of particular commercial interest are macroreticular types such as "Amberlyst" A 21, "Lewatit" MP 62, "Lewatit" MP 64, "Imac" A 20, "Zerolit" G, "Amberlite" IRA 93 and "Amberlyst" A 26.

The treatment of the crude oxo reaction mixture with the basic ion exchangers may be effected batchwise, but more preferably it is carried out continuously, for example in a so-called exchanger zone. We have found it advantageous to keep the ratio of length to diameter in the exchanger zone between 5:1 to 50:1. In general the throughput of oxo reaction mixture per kg. of basic ion exchanger is from 0.1 to 10 kg. per hour.

The process of the present invention is carried out, for example, by producing an oxo reaction mixture in known manner and then immediately passing the resulting oxo reaction mixture without further treatment through an exchanger zone in which the specified basic ion exchangers are located, at the specified temperatures and pressures. We prefer to use oxo reaction mixtures in which the starting olefin has been converted to a degree of at least 80%, more preferably of up to more than 90%, to oxo reaction products. The effluent oxo reaction mixture from which the metal carbonyl catalyst has been removed contains only a few p.p.m. of catalyst metal. It can thus be worked up without further treatment in the usual manner, for example by fractional distillation.

The process of the invention is further illustrated in the following examples.

EXAMPLE 1

Two high-pressure tubes are connected in cascade fashion, the first tube having a length of 500 mm. and an inside diameter of 30 mm. and being charged with 120 g. of "Amberlyst" A 21, whilst the second has a length of 500 mm. and an inside diameter of 45 mm. and is charged with 222 g. of "Amberlyst" A 21. 90 g./h. of an oxo reaction product are passed upwardly through the two tubes in succession, which oxo reaction product has been produced by reaction of octene-1 with a mixture of carbon monoxide and hydrogen in equal proportions by volume in the presence of rhodium carbonyl at a temperature of 120° C. and a pressure of 280 atmospheres gauge, the said reaction product containing more than 80% by weight of $C_9$ aldehydes and 20 p.p.m. of rhodium calculated as metal. In the high pressure tube the temperature is kept at from 20 to 30° C. and the pressure at 280 atmospheres gauge. The purified oxo reaction mixture has rhodium content of less than 0.1 p.p.m.

EXAMPLE 2

Example 1 repeated except that only the first high-pressure tube is used and through this there is passed the oxo reaction mixture mentioned in Example 1 and containing rhodium at a concentration of 20 p.p.m. The oxo reaction mixture purified in this manner contains 0.3 p.p.m. of rhodium.

EXAMPLE 3

Example 1 is repeated except that only the first high-pressure tube is used and this is charged with an oxo reaction mixture similar to that used in Example 1 but having a rhodium content of 40 p.p.m. After the treatment the oxo reaction mixture contains rhodium at a concentration of 0.6 p.p.m.

EXAMPLE 4

Example 3 is repeated except that an oxo reaction mixture is used which is obtained by the hydroformylation of octene-1 at 80° C. and which contains 80% by weight of $C_9$ aldehydes. The purified oxo reaction mixture contains 3 p.p.m. of rhodium.

EXAMPLE 5

Example 2 is repeated except that an oxo reaction mixture is used which is obtained by reacting isomeric octenes at 150° C. and a pressure of 280 atmospheres with a gas mixture of equal parts by volume of carbon monoxide and hydrogen in the presence of rhodium carbonyl as catalyst. Before purification the oxo reaction mixture contains 20 p.p.m. of rhodium in the form of rhodium carbonyl. After purification the oxo reaction mixture contains 0.1 p.p.m. of rhodium.

EXAMPLE 6

An oxo reaction mixture obtained by reacting vinyl glycol diacetate with a gas mixture of equal parts by volume of carbon monoxide and hydrogen at 110° C. and under a pressure of 280 atmospheres in the presence of 40 p.p.m. of rhodium in the form of rhodium carbonyl is passed at a rate of 100 cm.³ per hour through an exchanger tube having a length of 500 mm. and an inside diameter of 45 mm. and charged with 220 g. of "Amberlyst" A 21, the pressure in the tube being 280 atmospheres gauge and the temperature 20–30° C. The purified oxo reaction mixture contains 3 p.p.m. of rhodium.

EXAMPLE 7

An oxo reaction mixture obtained by reacting octene-1 with a gas mixture of equal parts by volume of carbon monoxide and hydrogen at 160° C. and 280 atmospheres gauge in the presence of 20 p.p.m. of rhodium as rhodium carbonyl is passed at a rate of 100 cm.³ per hour through an exchanger tube having a length of 500 mm. and an inside diameter of 10 mm. and charged with 20 g. of "Amberlyst" A 21. The quantitatively converted oxo reaction mixture contains, after purification, less than 1 p.p.m. of rhodium.

EXAMPLE 8

Example 2 is repeated except that the crude oxo reaction mixture is treated at a temperature of 60° C. The thus purified oxo reaction mixture contains rhodium at a concentration of 0.1 p.p.m.

Equally good results are obtained when the treatment is carried out at a temperature of 120° C.

EXAMPLE 9

An oxo reaction mixture obtained by reacting octene-1 with a gas mixture of equal parts by volume of carbon monoxide and hydrogen at 140° C. and under a pressure of 280 atmospheres gauge in the presence of 0.09% by weight of cobalt as cobalt carbonyl is passed at a rate of 90 g. per hour through an exchanger tube having a length of 500 mm. and an inside diameter of 30 mm. and charged with "Amberlyst" A 21, the pressure in the tube being 280 atmospheres gauge and the temperature 60° C. The purified oxo reaction mixture contains 0.001 to 0.003% by weight of cobalt.

If the purification is carried out at 120° C. the purified oxo reaction mixture contains less than 0.001% by weight of cobalt.

EXAMPLE 10

Example 9 is repeated except that the basic ion exchanger resin used is "Lewatit" MP 62. The oxo reaction mixture purified at 60° C. contains 0.006% by weight of cobalt, and the oxo reaction mixture purified at 120° C. contains 0.001% by weight of cobalt.

We claim:

1. An improved process for the separation of metal carbonyl catalysts capable of forming carbonylate anions by the treatment of crude oxo reaction mixtures with ion exchangers, wherein the improvement comprises treating said crude oxo reaction mixture with an ion exchanger containing primary, secondary, tertiary and quaternary amino groups at a temperature of from 0° to 120° C. and a pressure of from 5 to 700 atmospheres.

2. The process as claimed in claim 1 wherein the oxo reaction mixtures contain cobalt or rhodium carbonyl catalysts.

3. The process as claimed in claim 1 wherein ion exchanger resins based on polystyrene and containing tertiary amino groups or quaternary amino groups in the basic form are used.

4. The process as claimed in claim 1 wherein the ion exchanger resin is located in an exchanger zone which has a length to diameter ratio of from 5:1 to 50:1.

5. The process as claimed in claim 1 wherein the throughput of oxo reaction mixture per kg. of ion exchanger resin is from 0.1 to 10 kg. per hour.

6. The process as claimed in claim 1 wherein a temperature of from 20° to 60° C. and a pressure of from 20 to 300 atmospheres are used.

References Cited

UNITED STATES PATENTS 3,188,351   1/1963   Lemke _____ 23—203 C X

FOREIGN PATENTS

| 649,213 | 9/1962 | Canada | 252—411 |
| 1,114,468 | 10/1961 | Germany | 252—411 |
| 922,107 | 3/1963 | Great Britain | 252—411 |

EARL C. THOMAS, Primary Examiner

H. S. MILLER, Assistant Examiner

U.S. Cl. X.R.

252—411 R